United States Patent
Lim et al.

(10) Patent No.: US 7,447,004 B2
(45) Date of Patent: Nov. 4, 2008

(54) PORTABLE DISPLAY APPARATUS

(75) Inventors: Seon-woo Lim, Suwon-si (KR);
Yong-ha Shin, Suwon-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 0 days.

(21) Appl. No.: 11/368,644

(22) Filed: Mar. 7, 2006

(65) Prior Publication Data

US 2006/0203439 A1  Sep. 14, 2006

(30) Foreign Application Priority Data

Mar. 8, 2005  (KR)  ...... 10-2005-0019350

(51) Int. Cl.
G06F 1/16 (2006.01)
H05K 5/00 (2006.01)
H05K 7/00 (2006.01)
H05K 7/14 (2006.01)
H01R 13/502 (2006.01)

(52) U.S. Cl. ............ 361/681; 361/752; 361/728; 174/535; 174/560

(58) Field of Classification Search ......... 361/679, 361/681, 683, 686, 687, 692, 736, 724, 728, 361/100, 752; 600/510; 174/535, 560
See application file for complete search history.

(56) References Cited

U.S. PATENT DOCUMENTS

| | | | | |
|---|---|---|---|---|
| 5,123,419 A * | 6/1992 | Platt et al. | ............ | 600/510 |
| 6,101,087 A * | 8/2000 | Sutton et al. | ............ | 361/686 |
| 6,229,695 B1 * | 5/2001 | Moon | ............ | 361/683 |
| 6,310,767 B1 * | 10/2001 | Spear et al. | ............ | 361/681 |
| 6,330,148 B1 * | 12/2001 | Won et al. | ............ | 361/681 |
| 6,388,870 B1 * | 5/2002 | Canova et al. | ............ | 361/683 |
| 6,421,231 B1 * | 7/2002 | Jung | ............ | 361/681 |
| 6,532,152 B1 * | 3/2003 | White et al. | ............ | 361/692 |
| 6,560,092 B2 * | 5/2003 | Itou et al. | ............ | 361/681 |
| 6,812,976 B2 * | 11/2004 | Satonaka | ............ | 349/58 |
| 6,842,333 B2 * | 1/2005 | Lee et al. | ............ | 361/681 |
| 6,895,419 B1 * | 5/2005 | Cargin et al. | ............ | 708/131 |
| 6,917,517 B1 * | 7/2005 | Iida | ............ | 361/683 |
| 6,930,734 B2 * | 8/2005 | Lee | ............ | 349/58 |
| 6,989,986 B2 * | 1/2006 | Kumagai et al. | ............ | 361/681 |
| 2003/0048598 A1 * | 3/2003 | Lee et al. | ............ | 361/681 |
| 2003/0086245 A1 * | 5/2003 | Wakabayashi et al. | ...... | 361/719 |
| 2004/0042160 A1 * | 3/2004 | Yang et al. | ............ | 361/681 |
| 2006/0079128 A1 * | 4/2006 | Chintala et al. | ............ | 439/594 |

FOREIGN PATENT DOCUMENTS

KR  10-438433  7/2004

* cited by examiner

*Primary Examiner*—Jayprakash N Gandhi
*Assistant Examiner*—Bradley H Thomas
(74) *Attorney, Agent, or Firm*—Stanzione & Kim, LLP

(57) ABSTRACT

The present invention relates to a portable display apparatus including a main body casing to form an external appearance; a display panel provided in the main body casing, and displaying a picture; a main printed circuit board (PCB) provided in the main body casing to be disposed on a first side of the display panel; a first coupling member to couple a first side of the main PCB to the main body casing; and a second coupling member disposed on a first side of the display panel to be spaced from the first coupling member to couple a second side of the main PCB to the main body casing.

3 Claims, 3 Drawing Sheets

PORTABLE DISPLAY APPARATUS

CROSS-REFERENCE TO RELATED APPLICATIONS

This application claims priority to and the benefit of Korean Patent Application No. 2005-0019350, filed on Mar. 8, 2005, which is hereby incorporated by reference for all purposes as if fully set forth herein.

BACKGROUND OF THE INVENTION

1. Field of the Invention

The present invention relates to a portable display apparatus, and more particularly, to a portable display apparatus having a main printed circuit board (PCB) with simplified coupling structure.

2. Description of the Related Art

Developments in technology relating to wireless communication networks makes it possible to perform computer-based operations and access a wireless network while moving between locations. Various apparatuses provide mobile computing, such as a laptop computer, a notebook computer, a palm computer, a personal digital assistant (PDA), a hand-held personal computer (HPC), a smart phone, etc.

Korean Patent No. 10-0438,433 describes a portable communication device that combines the PDA and a digital camera. The portable communication device includes a first housing having a digital camera lens and a speaker; a second housing that is rotatably coupled with the first housing, the second housing having a PDA wide touch screen on a first side and a phone keypad and a phone LCD on a second side; and a biaxial hinge part to couple the first housing and the second housing.

The portable devices, which are becoming smaller in size, provide enhanced functions such as a mobile phone function, a motion picture display function, a camera function, etc.

Such enhanced functions require additional components to be installed in the portable devices. Thus, it is necessary to provide a simplified supporting structure to accommodate various components in the small portable devices, thereby providing easier component assembly, reduced production cost and improved productivity and internal space usability of the housing.

SUMMARY OF THE INVENTION

The present invention provides a portable display apparatus having a simplified coupling structure of a main printed circuit board (PCB).

Additional features of the invention will be set forth in the description which follows, and in part will be apparent from the description, or may be learned by practice of the invention.

The present invention discloses a display apparatus including a casing, a display panel provided in the casing, a main printed circuit board (PCB) provided on a first side of the display panel, a first coupling member to couple a first side of the main PCB with the casing, and a second coupling member provided on a first side of the display panel and spaced from the first coupling member to couple a second side of the main PCB with the casing.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DESCRIPTION OF THE ILLUSTRATED EMBODIMENTS

Figure 1:
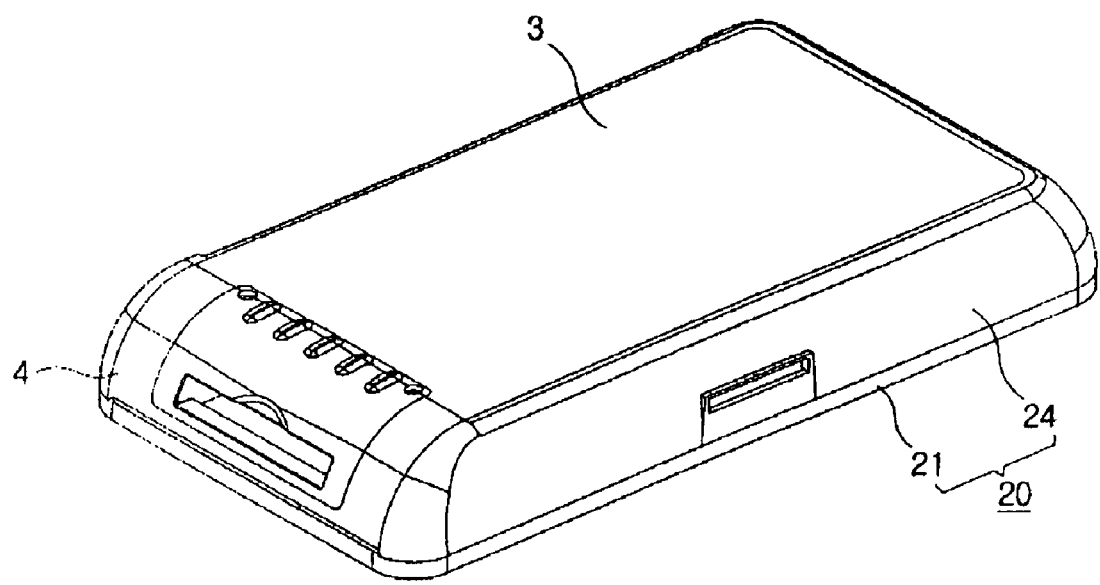
FIG. 1 is a perspective view of an embodiment of a portable display apparatus.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity.

It is understood that when an element or layer is referred to as being "on" or "connected to" or "connected with" another element or layer, it can be directly on or directly connected to or with the other element or layer or intervening elements or layers may be present.

Figure 2:
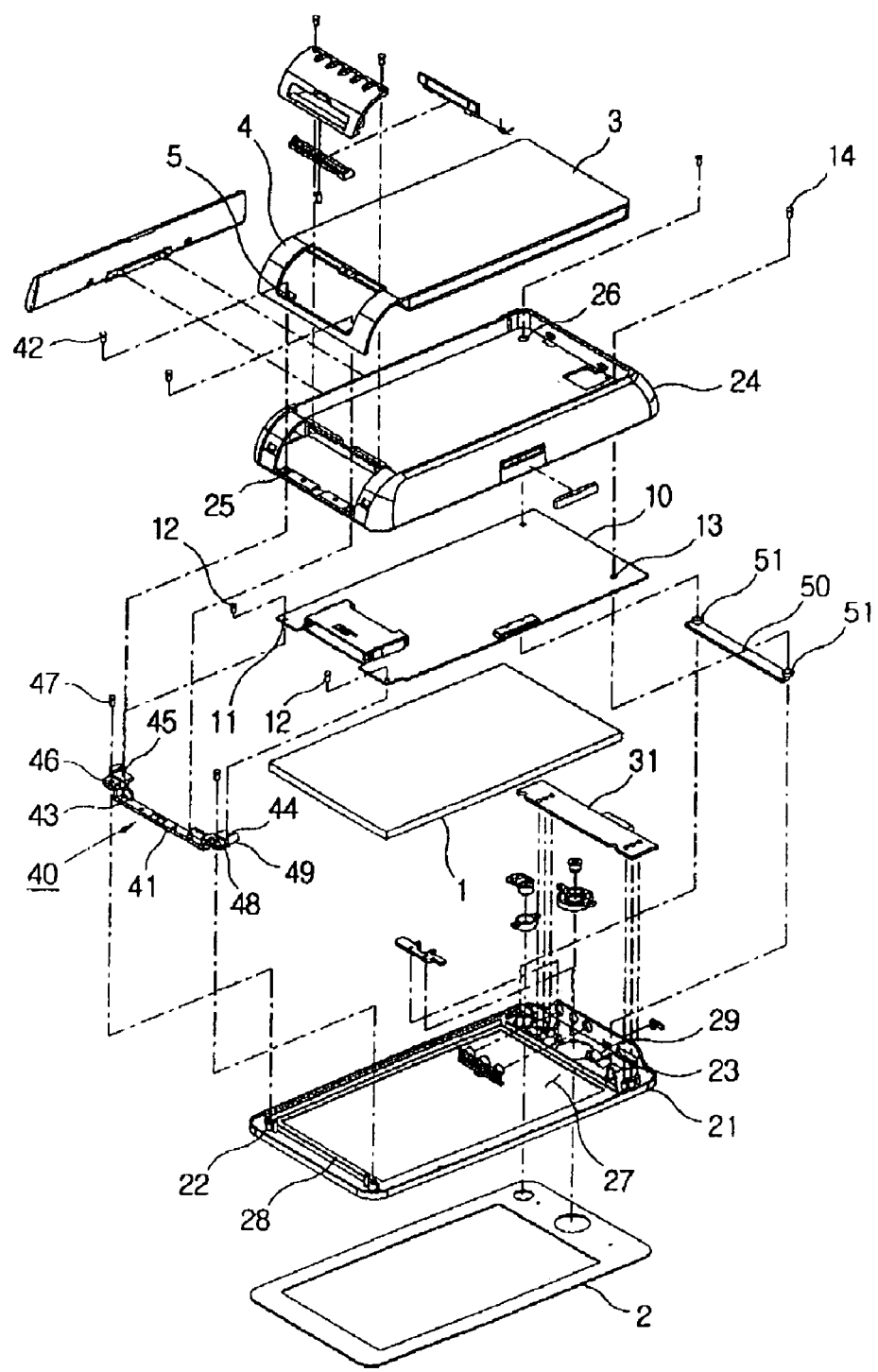
FIG. 2 is an exploded perspective view of the portable display apparatus shown in FIG. 1.
Figure 3:
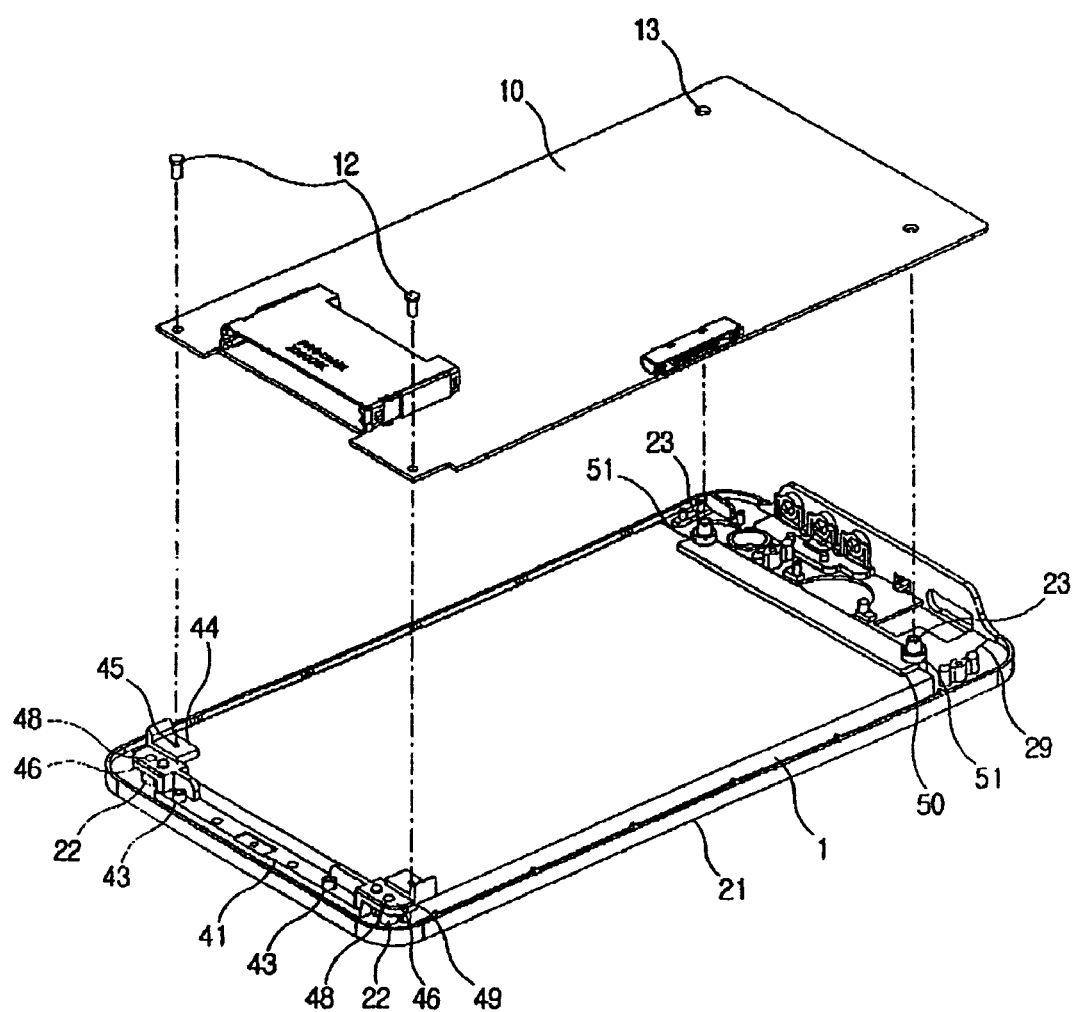
FIG. 3 shows the coupling state of a front cover and a display panel, and a first coupling member and a second coupling member.

As shown in FIGS. 1, 2 and 3, according to an embodiment of the invention a portable display apparatus includes a DMB chip for digital multimedia broadcasting (DMB) and various hardware components including a wireless communication module. For example, the wireless communication module is one that can provide excellent reception quality of a fixed line and mobile networks. The portable display apparatus may include various other multimedia supporting functions, including an MP3 player.

The portable display apparatus has a display panel 1 to change a DMB signal into a picture through the DMB chip disposed therein, to display the picture; a main PCB 10 transmitting a signal, e.g. a picture signal, etc., to the display panel 1; a main body casing 20 having a front cover 21 and a rear cover 24 supporting the display panel 1. A cover member 2 may be provided on the front cover 21. The cover member 2 may be made of acryl. As shown in FIG. 2, the cover member 2 is provided in front of the front cover 21. A battery 3 is mounted to or attached with a back of the rear cover 24 to supply power.

The front cover 21 includes a panel supporting part 28 supporting the display panel 1. The front cover 21 includes a front opening 27 to expose the display panel 1 to the outside. The front cover further includes a button installation part 29 partitioned with the panel supporting part 28. The button installation part 29 includes various buttons and an auxiliary printed circuit board 31.

The portable display apparatus may further include a first coupling member 40 to couple a first side of the main PCB 10, and the front cover 21, and the rear cover 24; and a second coupling member 50 to couple a second side of the main PCB 10, and the front cover 21 and the rear cover 24. The first coupling member 40 and the second coupling member 50 are provided on opposite sides of the display panel 1.

A first side of the first coupling member 40 is coupled with the main PCB 10, and a second side of the first coupling member 40 is coupled with the front cover 21, thereby coupling the main PCB 10 and the front cover 21.

The first coupling member 40 includes a contacting part 41 which may be a substantially plate like shape in a predetermined size to couple with the rear cover 24; a first substrate coupling part 44 bent at opposite ends of the contacting part 41 and coupled with the first side of the main PCB 10; a first front cover coupling part 46 extending from the first substrate coupling part 44 to form a stepped portion 49 that couples with the front cover 21. The first substrate coupling part 44 is formed higher than the first front cover coupling part 46. A portion of the display panel 1 that is or the stepped portion 49 is supported by the stepped portion 49.

The first substrate coupling part 44 includes a first coupling hole 45 that couples with a first part 12 to be inserted into a first substrate coupling hole 11 of the main PCB 10. The first front cover coupling part 46 is formed with a first insertion opening 48 into which a second part 47 is inserted to be coupled to a first coupling boss 22 of the front cover 21. The contacting part 41 includes a coupling boss 43 which is coupled with a third part 42 inserted into an extender 4 of the battery 3 and first penetrating parts 5 and 25 of the extender 4 of the battery 3 and the rear cover 24, respectively. The first screw 12, the second screw 47, and the third screw 42 may be a screw, a tab, a projecting piece, or anything that can be inserted into the first substrate coupling hole 11, the first insertion opening 48, and the extender 4, respectively.

The second coupling member 50 has a substantially plate like shape in a predetermined size. The second coupling member 50 includes a pair of coupling parts 51 for coupling the main PCB 10 and the front cover 21. The coupling parts 51 are inserted with a second coupling boss 23 of the front cover 21, and a fourth part 14 which is inserted into a second penetrating part 26 of the rear cover 24 and a second substrate coupling hole 13 of the main PCB 10 is coupled with the second coupling boss 23 of the front cover 21. The fourth part 14 may be a screw, a tab, a projecting piece, etc.

The coupling process of the portable display apparatus is described below according to the above described configuration.

The cover member 2 is provided on a front surface of the front cover 21. The button installation part 29 of the front cover 21 is coupled with various buttons and the auxiliary PCB 31. The display panel 1 is coupled with the panel supporting part 28 of the front cover 21, and the main PCB 10 is coupled with the back of the display panel 1. The front cover 21 is coupled with the rear cover 24 mounted with the battery 3. It is understood that the coupling process of the portable display apparatus is not limited to the foregoing process.

When assembling the front cover 21 provided with the display panel 1, the main PCB 10 and the rear cover 24 on the panel supporting part 28, the coupling process by using the first coupling member 40 and the second coupling member 50 may be performed according to the process described below. However, the coupling process is not limited to the process described below.

The front cover 21 is coupled with the first coupling member 40 and the second coupling member 50 disposed on opposite ends of the display panel 1 provided in the panel supporting part 28 of the front cover 21. The first coupling member 40 may be simultaneously coupled with the front cover 21 by the second part 47 which is inserted into the first insertion opening 48 of the first front cover coupling part 46 and coupled with the first coupling boss 22. The second coupling member 50 is coupled with the front cover 21 while the second coupling boss 23 of the front cover 21 may be simultaneously inserted into the coupling parts 51. As a portion of the display panel 1 is inserted into or placed on the stepped portion 49, the display panel 1 may be pressed so that it is supported or held by a lower surface of the first substrate coupling part 44.

When the main PCB 10 is laminated on the display panel 1, the first substrate coupling hole 11 of the main PCB 10 communicates with the first coupling hole 45 formed in the first substrate coupling part 44 of the first coupling member 40 coupled to the front cover 21. The second substrate coupling hole 13 communicates with the coupling parts 51 of the second coupling member 50 coupled with the front cover 21. Thus, the first part 12 is inserted into the first substrate coupling hole 11 of the main PCB 10 to be coupled with the first coupling hole 45.

After coupling the rear cover 24 with the front cover 21, the third part 42 inserted into the extender 4 of the battery 3 and the first penetrating openings 5 and 25 of the rear cover 24 is coupled with the coupling boss 43 formed in the contacting part 41 of the first coupling member 40. The fourth part 14 inserted into the second penetrating opening 26 of the rear cover 24 and the second substrate coupling hole 13 is coupled with the second coupling boss 23 of the front cover 21, which is inserted into the coupling parts 51 of the second coupling member 50.

As described above, the internal space formed with the front cover 21 and the rear cover 24 is coupled with the main PCB 10 by the first coupling member 40 and the second coupling member 50, thereby providing the portable display apparatus with a simplified structure or compared with a conventional portable display apparatus and improving productivity and reducing the number of components provided therein.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents

What is claimed is:

1. A display apparatus comprising:
a front cover and a rear cover coupled together to define a casing;
a display panel provided within the casing and viewable through a window of the front cover;
a main printed circuit board (PCB) provided between the display panel and the rear cover;
a first coupling member disposed on an upper portion of the front cover to connect the PCB and the rear cover to the front cover; and
a second coupling member, spaced apart and unconnected from the first coupling member, disposed on a bottom portion of the front cover to connect the PCB and the rear cover to the front cover;
wherein the first coupling member comprises:
a first flat portion disposed against the upper portion of the front cover to couple with the rear cover,
a pair of substrate coupling portions extending from opposite sides of the first flat portion and raised away from the front cover to couple with the front cover; and
a pair of stepped portions extending from the substrate coupling portions to couple with the PCB.

2. The display apparatus of claim 1, wherein the display panel is supported against the front cover by at least the stepped portions of the first coupling member and at least a portion of the second coupling member.

3. The display apparatus of claim 2, wherein the front cover comprises first and second sets of coupling bosses at the upper and bottom portion of the front cover, respectively, the first coupling bosses couple to the pair of substrate coupling portions, and the second coupling bosses couple to the second coupling member.

* * * * *